No. 834,470. PATENTED OCT. 30, 1906.
R. HANSSEN.
PANTOGRAPH.
APPLICATION FILED APR. 21, 1905.
3 SHEETS—SHEET 1.
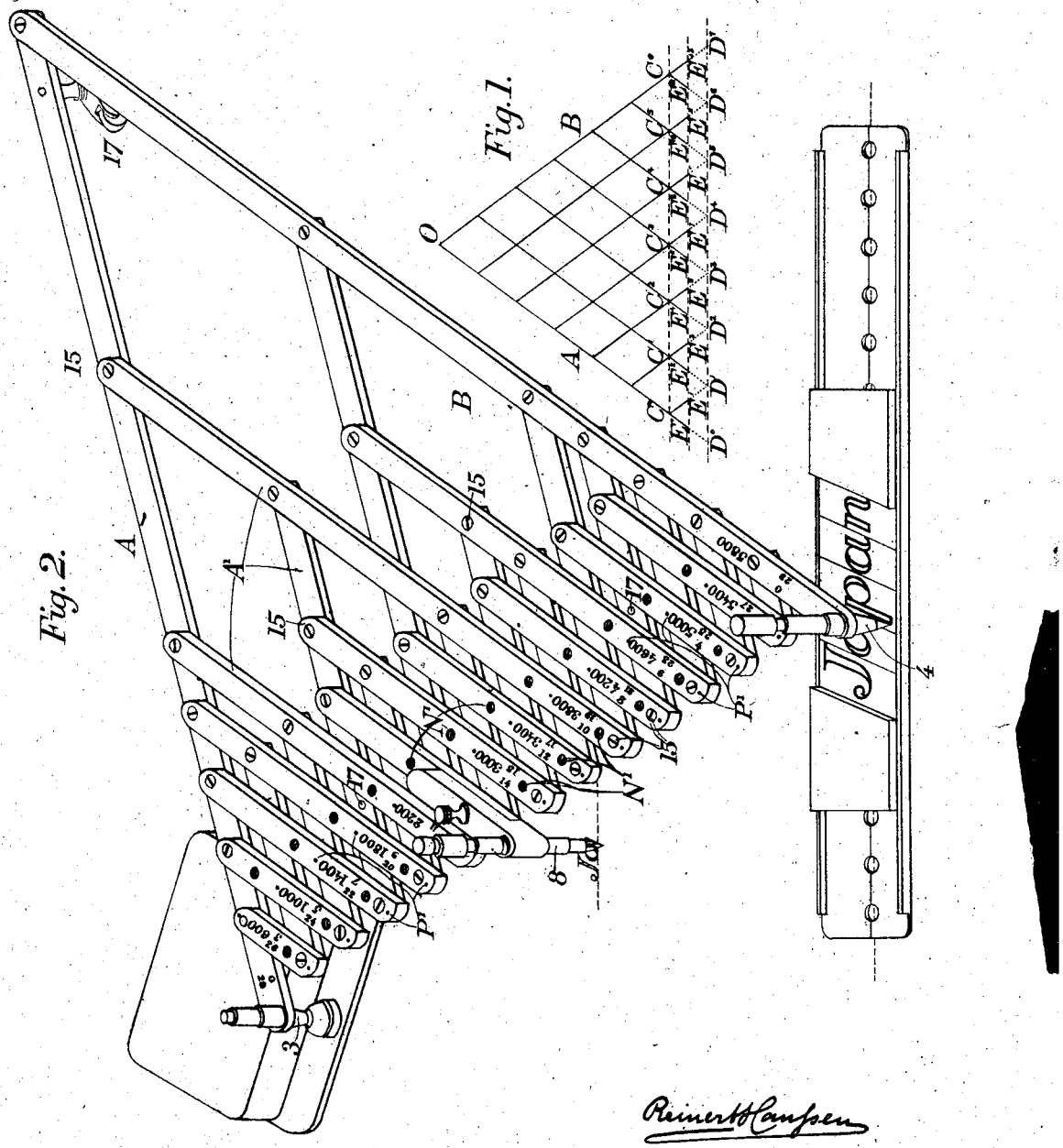
WITNESSES:
Patrick J. Barry.
Clarence B. Dorman.
Reinert Hanssen
INVENTOR
BY
ATTORNEY

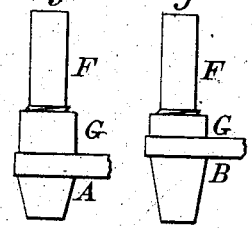
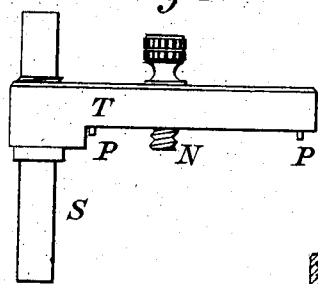
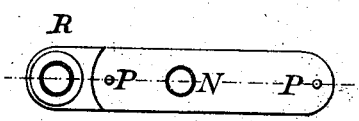
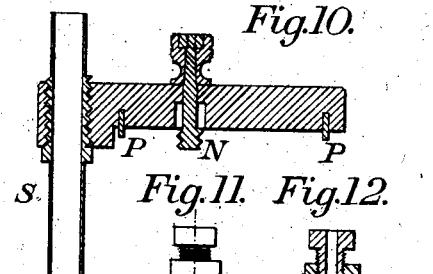
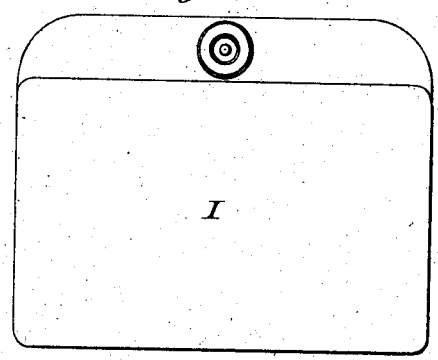
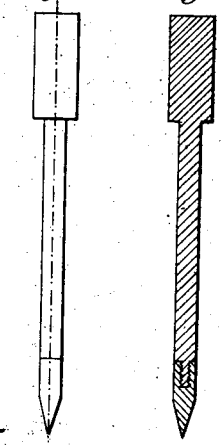
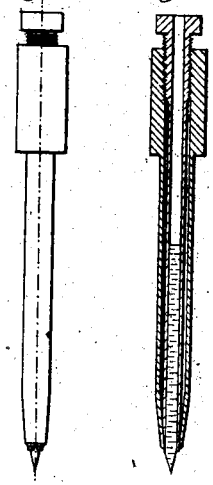
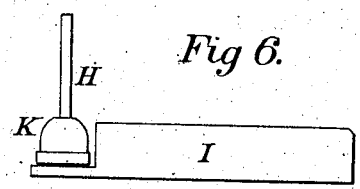
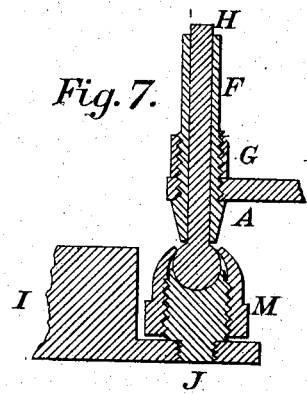
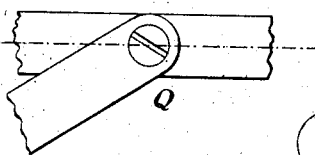
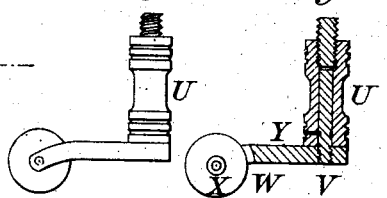

No. 834,470. PATENTED OCT. 30, 1906.
R. HANSSEN.
PANTOGRAPH.
APPLICATION FILED APR. 21, 1905.
3 SHEETS—SHEET 3.
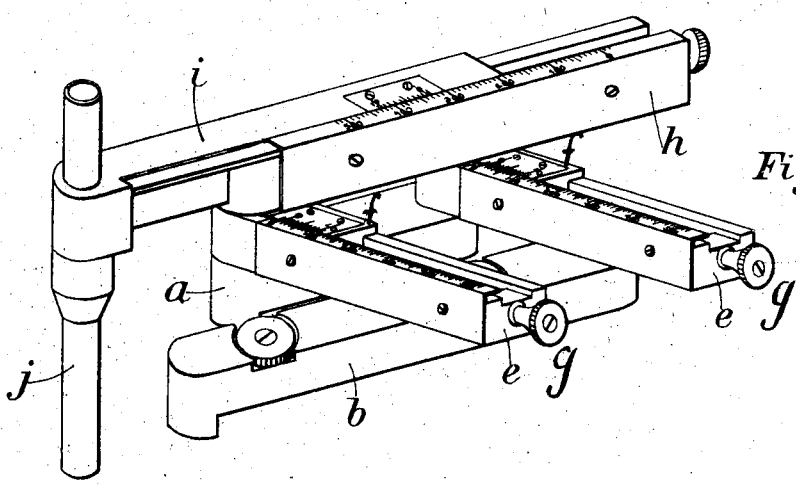
Fig. 19.
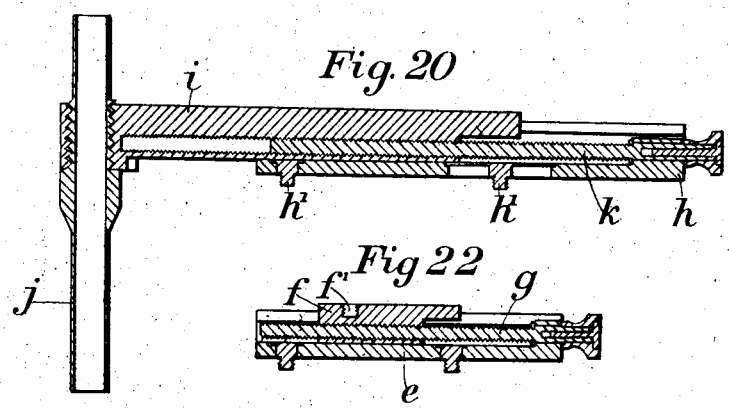
Fig. 20.  Fig. 21.
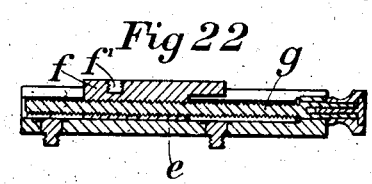  Fig. 23.
Fig. 22.
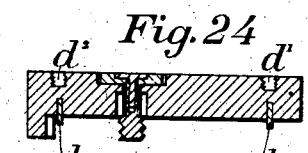
Fig. 24.
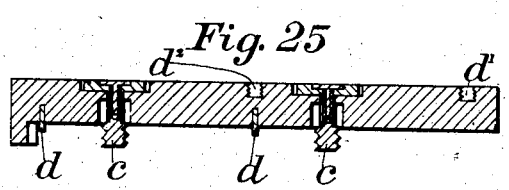
Fig. 25.
WITNESSES:
Patrick J. Barry
Clarence B Dorman
Reinert Hanssen
INVENTOR
BY
ATTORNEY

UNITED STATES PATENT OFFICE.

REINERT HANSSEN, OF FRANKFORD, PENNSYLVANIA.

PANTOGRAPH.

No. 834,470.  Specification of Letters Patent.  Patented Oct. 30, 1906.

Application filed April 21, 1905. Serial No. 256,810.

*To all whom it may concern:*

Be it known that I, REINERT HANSSEN, a citizen of the United States, residing at Frankford, county of Philadelphia, and State of Pennsylvania, have invented a certain new and useful Improvement in Pantographs, of which the following is a specification.

My invention relates to a new and useful improvement in pantographs, and has for its object to provide a pantograph in which the changes from one proportion to another can be made directly and quickly without taking the instrument apart, and the whole instrument can be made at a comparatively small cost and will be positive in its action, not liable to get out of order, and will be accurate in its working.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a diagrammatical view of my improved pantograph; Fig. 2, a perspective view of the pantograph in use; Fig. 3, a side view of the fixed-point socket; Fig. 4, a side view of the copying-point socket; Fig. 5, a plan view of the weight to which the fixed point is adapted to be attached; Fig. 6, a side elevation of the weight, together with the spindle over which the fixed-point socket is adapted to pass; Fig. 7, a longitudinal section through a portion of the weight, the spindle, and the fixed-point socket; Fig. 8, a side elevation of the attachment which is designed to be attached to any of the arms for holding the drawing-point; Fig. 9, a bottom plan view of Fig. 8; Fig. 10, a longitudinal section through Figs. 8 and 9; Fig. 11, the lead-pencil used in combination with the pantograph, that is adapted to fit in the holder shown in Fig. 10; Fig. 12, a longitudinal section of the same; Fig. 13, a side elevation of the stencil adapted to be used in an attachment similar to that shown in Figs. 8, 9, and 10; Fig. 14, a longitudinal section through the stencil; Fig. 15, a plan view of a portion of the pantograph, showing the pivotal point of the arms; Fig. 16, a longitudinal section of the same; Fig. 17, a side elevation of one of the casters or rollers that support the pantograph; Fig. 18, a longitudinal section of the same; Fig. 19, a perspective view of a micrometer attachment adapted to be attached to the pantograph for increasing the number of proportions; Fig. 20, a longitudinal section through the upper member of the attachment shown in Fig. 19; Fig. 21, a cross-section through Fig. 20; Fig. 22, a longitudinal section through one of the two intermediate sections of the attachment shown in Fig. 19; Fig. 23, a cross-section through Fig. 22; Fig. 24, a longitudinal section through the shorter of the two lower sections of the attachment shown in Fig. 19; Fig. 25, a longitudinal section through the longer of the two lower attachments shown in Fig. 19.

Referring to Figs. 1 to 18, inclusive, A and B represent the two extreme outside arms of the pantograph, which approach one another, so that they may be pivoted together at their junction, the other ends of said arms being free to spread or be brought together.

A' represents intermediate arms divided in two sets of equal numbers each. One set extends parallel with the outside arm A, arranged at equal distances apart, and the other set extends parallel with the outside arm B an equal distance apart, so that said arms will cross one another and in crossing will form equilateral quadrangles. All of the intermediate arms are pivoted together at the point where they cross one another at the base of the triangular frame and are pivoted together at any other points desirable, so as to hold the arms in the proper relation to one another and prevent the sagging of the frame. Of course the intermediate arms could be all extended through to the outside arms A and B, and all of the arms could be pivoted together wherever they intersect one another; but this would not be necessary in actual practice, as it would not only increase the cost and weight, but also add friction. Of course the two outside arms A and B need not necessarily be led together and pivoted; but I have found it makes the frame more stable to pivot the two outside arms together.

To the free ends of the arms A and B are fitted holders, either of which are adapted to hold a stencil-point, marking-point, or to be fitted over a fixed point. The numbers shown on Fig. 2 correspond with the numbers of the figures showing the details of the different parts.

Figs. 3 and 4 show a detail side elevation of the holders on the end of the arms A and B, and these holders consist simply of a cylinder F, threaded through the ends of the arms and bound in position by a lock-nut G, also threaded upon the cylinder F and binding against the top of the arm. Fig. 8 represents attachments adapted to be attached to any of the intermediate arms A', and these attachments consist of a body T, adapted to come in contact with the arm, a screw N passing through the body into screw-threaded holes N', formed in the arms. Pins P are adapted to enter holes P', also formed in the arms for keeping the body portion T in alinement, and in the outer end of the body portion R is secured a vertical tube S, through which is adapted to pass either a stencil-point, marking-point, or fixed point, according to the circumstances under which the pantograph is operated. A straight line drawn from the center of the two cylinders F would also pass through the center of the cylinder S, and this line would also be half-way between the pivotal point of the arms A' at the base of the frame and the intersection of said arms if said arms were prolonged.

It will be understood that if the end of the lever A is used for the fixed point of the pantograph and the end of the lever B is used for the tracing-point and the clamp upon the intermediate arms is used for the marking-point the pattern will be reduced and the nearer the clamp is moved toward the fixed point the smaller will be the reduction. If the clamp is used to hold the tracing-point and the marking-point is located at the end of the arm B, then the pattern will be enlarged, and the nearer the clamp is moved to the fixed point the greater will be the enlargement. Of course the fixed point can consist of a stationary spindle, which will pass through the cylinder F; but I have provided a special spindle which is attached to a movable weight I, adapted to rest upon the table. The spindle H, which passes through the cylinder F, has a ball formed at its lower end adapted to rest in a socket J, secured to the weight, and a nut M is threaded over the part forming the socket J, so that the ball portion of the spindle H cannot be removed vertically, but can be oscillated in all directions, and forms a regular ball-and-socket joint.

The framework of the pantograph is supported at suitable points by casters or rollers 17, (shown in detail in Figs. 17 and 18,) in which X represents the roller journaled in the outer end of a horizontal arm W, and in the other end of the horizontal arm is threaded a spindle V, which fits into a sleeve U and is held in said sleeve by a small screw Y, passing through the sleeve into an annular groove formed in the spindle V, so that the spindle will turn freely within the sleeve, but cannot be removed therefrom. The sleeve U is then threaded through the frame of the pantograph from below.

In Figs. 15 and 16 I have shown how the arms are pivoted together by means of the screws Q, and in Figs. 13 and 14 I have shown the stencil adapted to be used for tracing the pattern, and in Figs. 11 and 12 I have shown the marking-point, although I do not wish to be limited to any exact construction in regard to these details, the only essential feature being in regard to the stencil and marking point, that they will be weighted sufficiently to cause them to move freely in a vertical direction through the holder-tubes F and S. Of course two attachments, like 8, could be used or even three attachments secured to different arms, one being used for the fixed point, one for the stencil-point, and one for the marking-point. These attachments could be either secured to the upper arms or turned over and secured to the lower arm, thus giving double the number of proportions than could be obtained by only attaching it to one set of arms.

In Fig. 1 I have shown a diagram of the pantograph in which the line $C^0$–$C^6$ represents a line passing through the pivotal points of the arms at the base of the triangular frame. The line $D^0$ to $D^7$ represents the intersection of the arms, if said arms were continued beyond the line $C^0$–$C^6$, the line half-way between these two (lettered $E^0$–$E^{13}$) represents the line upon which the fixed, tracing, and marking points are located, and the letters $E^0$ to $E^{13}$, inclusive, represent the different points at which the holders may be placed, this diagram only showing six intermediate arms instead of thirteen, as in Fig. 2. It will thus be seen that if the marking-point and stencil-point were upon the line of the pivots at the base of the frame—that is, $C^0$ to $C^6$—there could be only half as many proportions obtained as upon the line $E^0$ to $E^{13}$. Therefore by prolonging certain arms used for the fixed, stencil, and marking points and by using both of the intermediate sets of arms I am enabled to increase the various proportions obtained. Thus it will be seen that according to the number of intermediate arms used the number of proportions can be increased or diminished.

In Fig. 2 it will be seen that any proportion can be obtained from one to twenty-nine, and if there were fifty-eight arms used instead of twenty-eight any proportion could be obtained from one to fifty-nine, and so on; but it will be seen that in order to increase the number of arms the width of the arms must be reduced, and thus the number of proportions to be obtained must necessarily be limited, and in order to provide an instrument of more delicate adjustment I have provided an attachment shown in Fig. 19, which consists of two blocks $a$ and $b$, which may be attached to two adjacent intermediate arms by means of screws $c$ and pins $d$. The letter $c$ denotes two blocks pivoted to the two blocks $a$ and $b$ and lying directly above two adjacent arms A′, intersecting the arms to which the blocks $a$ and $b$ are secured. Thus the blocks $a$ and $b$ will lie directly over and in alinement with two adjacent arms of one set, and the blocks $e$ will lie directly parallel with the arms of the other set, and these blocks $a$, $b$, and $e$ are pivoted together, so as to work in parallel lines as the framework is opened and closed. The blocks $e$ are exactly alike, and the two pivots of one of said blocks fit in the holes $d'$ of both of the blocks $a$ and $b$, and the pivots of the other block $e$ fit in the holes $d^2$ of the blocks $a$ and $b$. Each of the blocks $e$ is provided with longitudinal guideways in which are adapted to slide blocks $f$, and these blocks are adapted to be moved by longitudinal screws $g$, swiveled in the blocks $e$ and threaded through the blocks $f$. $h$ is a block extending across from one block $f$ to the other, to which it is pivoted, the two pivots $h'$ fitting into the holes $f'$ of the two blocks $f$. The upper surface of the blocks $e$ are provided with scales divided into any number of fractions of inches desired, and the upper surfaces of the blocks $f$ are provided with verniers adapted to coöperate with the scales for the purpose of setting the device. The block $h$ is also provided with a longitudinal guideway in which is adapted to slide the shank $i$, carrying upon its outer end the cylinder $j$, through which either the fixed point, stencil or marking point may pass. This shank $i$ is adapted to be moved in the guideway by means of a longitudinal screw $k$, swiveled in the block $h$. The block $h$ upon its upper surface is also provided with a scale divided the same as the scales upon the block $e$, and the shank $i$ is provided with a vernier adapted to coöperate with the scale for setting the instrument.

The operation of this micrometer device is as follows: Suppose we wish to use the ordinary holders for the fixed and copy point and use the holder $j$ for the tracing-point. The scales are so arranged that when the instrument is fixed to the pantograph and the verniers of each of the three scales are set on "0," then the tracing-point will be in use with the fixed point and with the copying-point and the tracing-point will be upon a line drawn exactly longitudinally through the upper arm of the pantograph to which the block $a$ is fixed. In this position the pantograph will work the same as where the ordinary attachments are used. We will suppose that the scales are divided into four hundred parts, and when all of the verniers of the three scales are set on "400" the tracing-point will be upon a line drawn longitudinally through the center of the upper arm of the pantograph to which the block $b$ is secured, and the tracing-point will be upon a straight line drawn through the copying and fixed points the same as when the device was set at "0." Thus it will be seen that by the proper adjustment I am enabled to divide the space between any of the arms into as many parts as the scale is marked with graduations. Thus where the scale is divided into four hundred parts and there are twenty-nine arms in the pantograph one would have four hundred divisions for every two arms, and therefore we could work in proportions up to five thousand eight hundred instead of from one to twenty-nine, where the micrometer adjustment is not used. There are various ways of figuring out where to place the attachments for obtaining different porportions; but as this is no part of the invention I do not deem it necessary to describe these methods. In the micrometer attachment there could be two of these attachments used on one pantograph, if desired, one for the tracing-point and the other for the fixed or copying point.

Of course I do not wish to be limited to the exact construction here shown, as slight modifications could be made without departing from the spirit of my invention.

Having thus fully described my invention, what I claim as new and useful is—

1. In a pantograph, a framework consisting of two outside arms extending in a direction tending to intersect one another so as to form a triangular frame, a series of intermediate arms arranged in two sets of equal numbers between the two outside arms, one set extending parallel with one outside arm and the other set extending parallel with the other outside arm so as to intersect one another, all of said arms pivoted together so as to operate parallel with one another, all of the intermediate arms pivoted together along the base of the triangular frame in a straight line, removable attachments adapted to be attached to any of the arms so as to prolong these certain arms, a tube extending vertically through the attachment at the outer ends of the same, the center of said tube lying half-way between the line determined by the pivotal points of the intermediate arms at the base and the line determined by the points in which the intermediate arms would next intersect if prolonged, a fixed spindle over which one of the tubes of the attachments is adapted to fit, a stencil-point adapted to fit in another of the tubes and slide freely therein, a marking-point adapted to fit in another one of the tubes and slide freely therein, and casters or rollers secured to the frame for supporting the same, as specified.

2. In a pantograph, a framework consisting of two outside arms extending toward one another so as to intersect if prolonged and form a triangular framework, two sets of intermediate arms of equal number arranged between the outside arms, one set extending parallel with one arm and the other set extending parallel with the other arm, all of said arms arranged an equal distance apart, all of said arms being pivoted together at a sufficient number of their intersections to cause the arms to remain parallel when the frame is opened or closed, all of the intermediate arms being pivoted together along the base of the frame in a straight line, the two end arms being continued beyond the intermediate arms at the base, vertical tubes secured in these ends of the outer arms, a movable weight, a spindle secured at its end in a ball-and-socket joint arising from said weight over which one of the tubes is adapted to pass, a marking or stencil point adapted to pass through the other tube and be held in contact with the paper by the weight of the stencil or marking point, a line drawn from the center of one tube to the other, lying half-way between the line determined by the pivotal points of the intermediate arms at the base and the line determined by the points in which the intermediate arms would next intersect if prolonged, attachments adapted to be removably attached to any one of the intermediate arms, said attachments adapted to extend beyond the ends of the intermediate arms at the base, a vertical tube secured in the outer end of said attachment through which is adapted to pass a stencil or marking point, said tubes of the attachments being upon the same line as the tubes at the outer ends of the outer arms and swiveled rollers or casters secured to the frame and adapted to support the same, as and for the purpose specified.

3. In a pantograph, a framework consisting of two outer arms extending toward one another so as to intersect if prolonged, two sets of equal number of intermediate arms arranged between the outside arms, one set extending parallel with one arm and the other set extending parallel with the other arm, said arms being equally distant apart and pivoted together at a sufficient number of their intersections to cause the arms to operate parallel with one another, all of the intermediate arms being pivoted together and ending upon a straight line at the base, the outer arms being continued a distance beyond the base, vertical tubes passing through the outer ends of said arms, a line drawn from the center of one tube to the center of the other lying half-way between the line determined by the pivotal points of the intermediate arms at the base and the line determined by the points in which the intermediate arms would next intersect if prolonged, a fixed point over which one of the tubes is adapted to fit, a stencil or marking point adapted to fit in the other tube, two blocks adapted to be removably secured to two adjacent upper arms and lie parallel with said arms and in alinement therewith, two blocks extending across the two lower blocks and lying parallel with two adjacent and intersecting intermediate arms of the lower set, the two lower blocks and two upper blocks being pivoted together coincident with the pivotal point of the intermediate arms below, sliding blocks fitting into longitudinal guideways provided with the two upper blocks, longitudinal screws for sliding said blocks, scales provided upon the upper surface of the two upper blocks, verniers upon the upper surface of the two sliding blocks, a block extending across the two upper blocks and pivoted to the two sliding blocks, a shank sliding longitudinally in the guideway formed in this last-named block, a vertical tube forming a holder for a marking or stencil point secured in the outer end of said shank, a screw for the sliding of the shank, a scale formed upon the upper surface of this extreme upper block, a vernier formed upon the shank, the tube upon the shank extending beyond the ends of the intermediate arms at the base of the frame, and rollers or casters for supporting the frame, as specified.

4. In a pantograph, two outside arms extending toward one another so as to intersect if prolonged, two sets of intermediate arms arranged between the outside arms, one set extending parallel with one outside arm and the other set extending parallel with the other outside arm, all of said arms being pivoted together at a sufficient number of their intersections to cause the arms to operate in parallel lines, the intermediate arms being pivoted together in a straight line at the base, the outer arms extending a distance beyond the intermediate arms at the base, vertical tubes formed in the outer end of said outside arms, a line drawn from the center of one tube to the other being half the distance between the pivotal point of the intermediate arms at the base and the line of and the next point in which said arms would intersect if prolonged, a fixed point over which one of the tubes is adapted to fit, the other tube adapted to form a holder for either a marking or stencil point, rollers or casters for supporting the framework, a removable holder provided with a vertical tube for holding either a copying or stencil point adapted to be removably attached to any of the intermediate arms, means for adjusting said holder to any point between the adjacent arms and still retain the center of the tube on a line drawn center to center of the two outside tubes, as and for the purpose specified.

In testimony whereof I have hereunto affixed my signature in the presence of two subscribing witnesses.

REINERT HANSSEN.

Witnesses:
S. W. FOULKROD,
C. B. DORMAN.